US009652463B2

(12) United States Patent
McCoy

(10) Patent No.: US 9,652,463 B2
(45) Date of Patent: *May 16, 2017

(54) METHOD AND SYSTEM AND FILE FORMAT OF GENERATING CONTENT BY REFERENCE

(71) Applicant: SONY CORPORATION, Tokyo (JP)

(72) Inventor: Charles McCoy, Coronado, CA (US)

(73) Assignee: SONY CORPORATION, Tokyo (JP)

( * ) Notice: Subject to any disclaimer, the term of this patent is extended or adjusted under 35 U.S.C. 154(b) by 1017 days.

This patent is subject to a terminal disclaimer.

(21) Appl. No.: 13/755,649

(22) Filed: Jan. 31, 2013

(65) Prior Publication Data

US 2013/0144913 A1    Jun. 6, 2013

Related U.S. Application Data

(63) Continuation of application No. 12/904,035, filed on Oct. 13, 2010, now Pat. No. 8,458,221.

(51) Int. Cl.
*G06F 17/30* (2006.01)
*G06F 21/10* (2013.01)
*G11B 27/034* (2006.01)
*G11B 27/10* (2006.01)

(52) U.S. Cl.
CPC ........ *G06F 17/30058* (2013.01); *G06F 21/10* (2013.01); *G11B 27/034* (2013.01); *G11B 27/105* (2013.01)

(58) Field of Classification Search
None
See application file for complete search history.

(56) References Cited

U.S. PATENT DOCUMENTS 6,496,591 B1 * 12/2002 Rhoads ............... H04N 5/90
382/100
2009/0044689 A1 * 2/2009 Komori et al. ............... 84/625

* cited by examiner

*Primary Examiner* — Son T Hoang
(74) *Attorney, Agent, or Firm* — John L. Rogitz

(57) ABSTRACT

A method of generating content defined by a file of a prescribed format. A portion of a first work of content is automatically identified responsive to a user selection thereof. The first work of content may be audio, video, and still images. A reference to the portion of the first work of content is generated responsive to the identifying. Instructions associated with the portion of the first work of content operable for use by a playback device to render the content are generated. The reference and the instructions are incorporated in a digital file of a prescribed format operable for use by the playback device during rendition of the content. The file may be stored in a memory component. The playback device is operable to use the reference to access the portion of the first work of content from a source other than the file during rendition of the file.

19 Claims, 6 Drawing Sheets

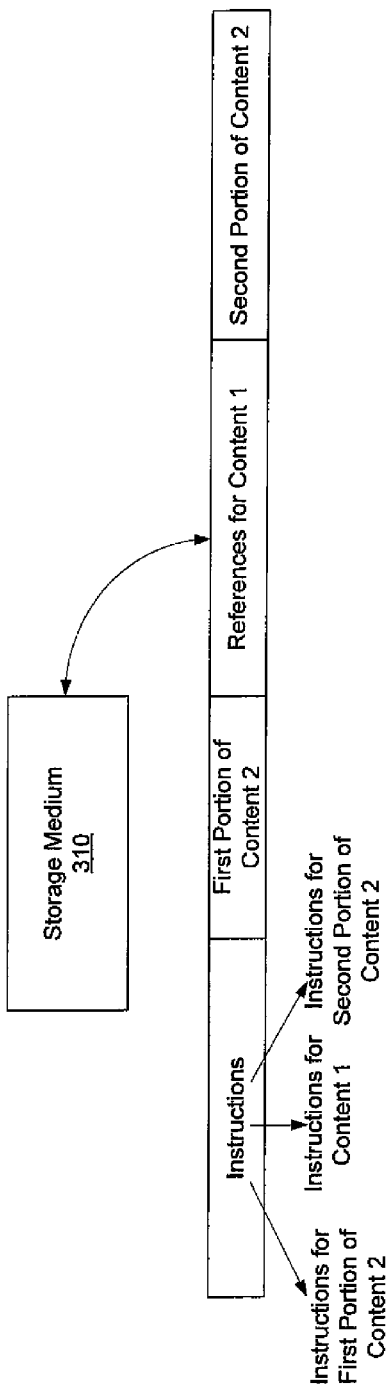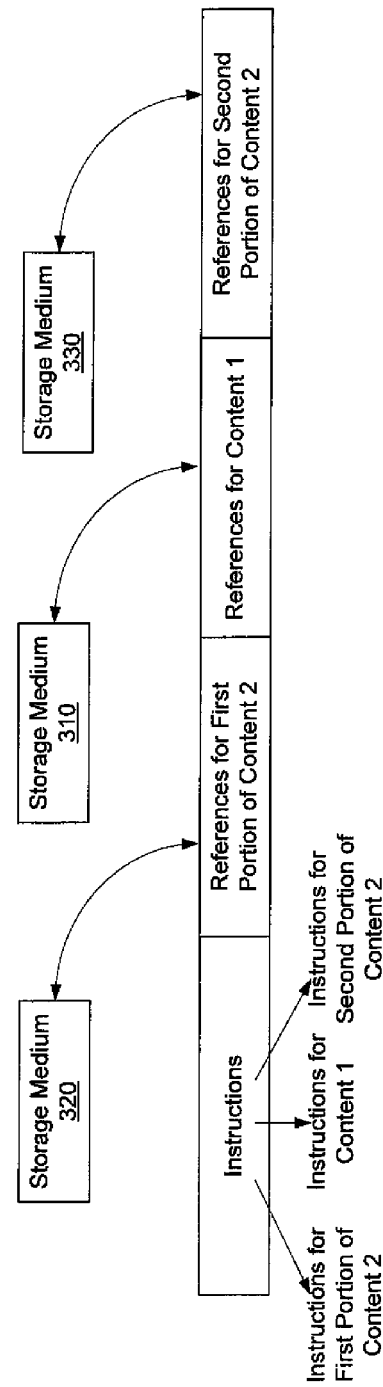
FIGURE 3A
FIGURE 3B

METHOD AND SYSTEM AND FILE FORMAT OF GENERATING CONTENT BY REFERENCE

TECHNICAL FIELD

Embodiments of the present invention relate to the field of electronics. More particularly, embodiments of the present invention relate to content generation including audio content.

BACKGROUND

In general, distribution of content created by others is not allowed unless a right or a license to use the content has been obtained. For example, a first musician that intends to incorporate a musical content created by a second musician into the work created by the first musician, for distribution thereof, is required to obtain the consent of the second musician. It is appreciated that the need to obtain a license from the artist that creates the content is not limited to audio content. For example, a license to use copyrighted content may be required for literally work, visual art, video, stilled images, etc.

Unfortunately, negotiating a contract between the right holder and others is not always possible and easy. For example, the right holder may be unwilling to license the content or it may be very expensive to obtain a license to use the copyrighted material. Also, rights negotiations can be time consuming and involve legal counsel. Moreover, one may need to obtain a license to use content from a third party agent and not directly from the artist that created the art work, thereby serving as an additional obstacle in obtaining a license to use the created art work. Accordingly, some artists are left with no option but to abandon the creation of their artistic work that incorporates work of others, thereby hindering art creation and artistic talent.

Moreover, modern digital recording and computer implemented mixing and playback applications have provided artists with increased flexibility in providing mixed works that draw from existing works of others. It would be advantageous to increase the freedom by which such artists can operate to produce and distribute their works.

SUMMARY

Accordingly, a need has arisen to enable artists to use and distribute artistic work made by others without a need to obtain a license, thereby promoting art and the creation of artistic work. Moreover, a need has arisen to promote art and the creation of artistic work by creating an artwork format that uses artistic works by others without a need to incorporate their content. It will become apparent to those skilled in the art in view of the detailed description of the present invention that the embodiments of the present invention remedy the above mentioned needs and provide the above referenced advantages.

According to one embodiment, a portion of content to be used in an art work is identified. A reference to the identified portion is generated. The reference may be the artist's name, a finger printing, a track number, a name of a song, or anything that can be used to identify a piece of art work uniquely. It is appreciated that in one embodiment, different versions of the same content are distinguished from one another using the reference. The entire content or merely a portion or track thereof may be specified.

In one embodiment, instructions associated with the portion of the content are generated based on the user input. Instructions may be commands associated with the manner of which the portion of the content is to be used during rendition. For example, instructions may indicate to speed up or slowdown a selected portion of the content during playback, overlap the content with other content, identify the track to play, reverse the order, provide echo, provide re-verb, perform compression/expansion, etc. Volume of the content can also be specified.

In one embodiment, the generated commands and the reference are incorporated in a digital file of a prescribed format. The file may be stored in a memory component for later use. It is appreciated that the file does not incorporate the portion of the content that the user has no right to distribute but rather includes a reference to it. As such, the playback device may access the portion of the content identified by the references, during rendition of the file, from a source other than the file, e.g., from a compact disc (CD), the Internet, etc. Therefore, artists may use and distribute content created by others without a need to obtain a license because the content created by others is not incorporated into the file but rather merely references thereto are used.

More particularly, a method of generating content is disclosed. The method includes automatically identifying a portion of a first work of content in response to a user selection thereof. The first work of content may be selected from a group consisting of audio, video, and still images. According to one embodiment, a reference to the portion of the first work of content is generated in response to the identifying. Instructions associated with the portion of the first work of content are generated. The instructions are operable for use during rendering by a playback device. The reference and the instructions are incorporated in a digital file of a prescribed format, wherein said file is operable for use by said playback device to render the content. It is appreciated that the file may be stored in a memory component.

It is appreciated that a portion of a second work of content may be received. According to one embodiment instructions associated with the portion of the second work of content are generated. The instructions are operable for use during rendering by the playback device. The portion of the second work of content and the instructions associated with the portion of the second work of content are incorporated in the file.

It is appreciated that in one embodiment, a portion of a third work of content is automatically identified in response to a user selection thereof. A reference to the portion of the third work of content is generated in response to the identifying the portion of the third work of content. Instructions associated with the portion of the third work of content are generated. The instructions are operable for use during rendering by the playback device. The reference to the portion of the third work of content and the instructions associated with the portion of the third work of content are incorporated in the file.

The playback device is operable to use the reference to access the portion of the first work of content from a source other than the file during rendition of the digital file. As such, the playback device is operable to render the portion of the first work of content based on effects specified by the instructions, e.g., to create audio playback effects and/or control volume.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 3A and 3B show exemplary playback of content generated in accordance with one embodiment of the present invention.

DETAILED DESCRIPTION

Figure 1:
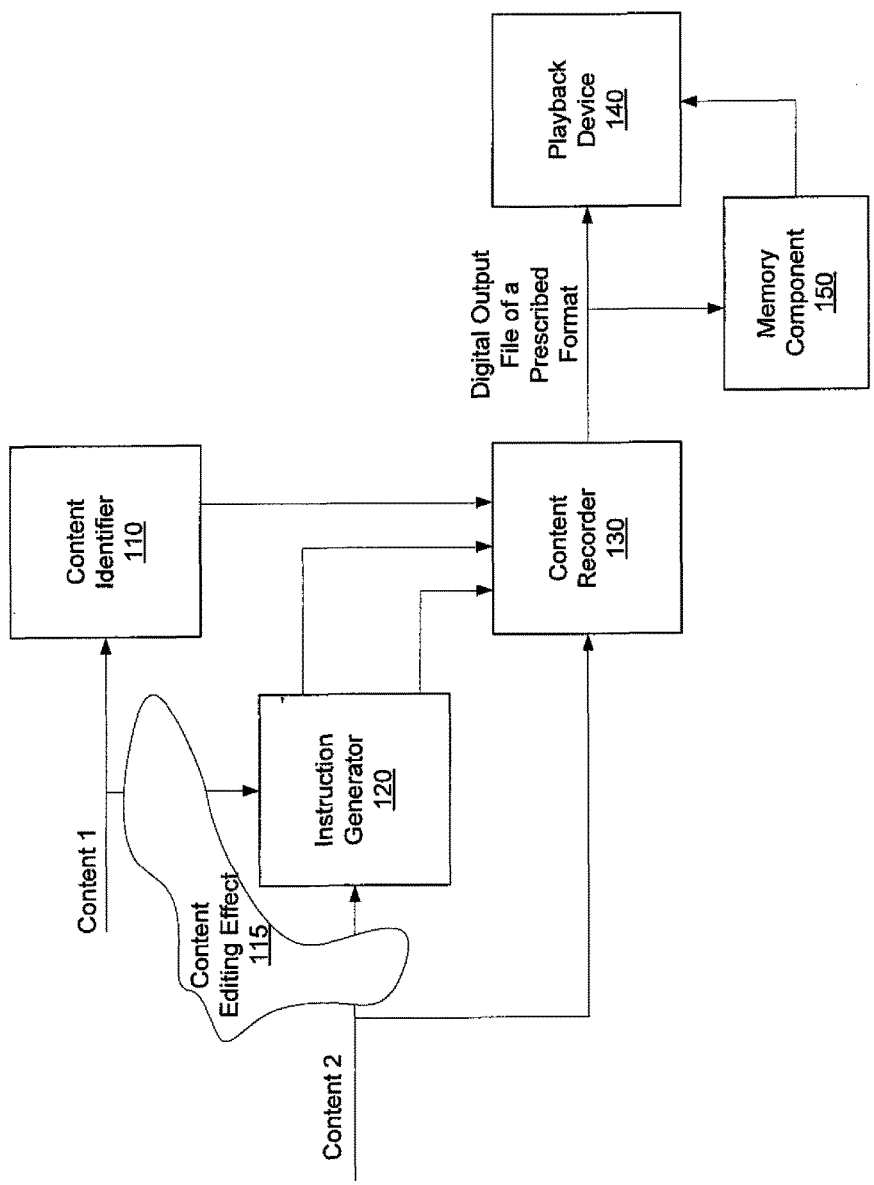
FIG. 1 shows a system for generating content in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, television set executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, packets, messages, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "identifying" or "instructing" or "issuing" or "altering" or "clearing" or "accessing" or "receiving" or "detecting" or "obtaining" or "selecting" or "calculating" or "measuring" or "querying" or "receiving" or "sending" or "providing" or "storing" or "displaying" or "rendering" or "generating" or "incorporating" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System and File Format of Generating Content by Reference

Referring now to FIG. 1, a system 100 for generating content in accordance with one embodiment of the present invention is shown. The system 100 includes a content identifier 110, an instruction generator 120, a content editing effect 115 component, a content recorder 130, and a memory component 150. The system 100 may optionally include a playback device 140, However, it is appreciated that the playback device 140 may be separate from system 100.

It is appreciated that the generated content may be audio, video, still images, literally work, etc. The exemplary embodiments described herein are related to musical work but are not limited thereto. For example, the exemplary embodiments described herein are equally applicable to literally work, visual work, video, still images, etc.

In this exemplary embodiment, the user or artist may wish to create a new musical work from existing musical works. For example, the user may wish to create a music remix work based on user created music and further based on music created by someone other than the user. The music created by someone other than the user may be accessed by the user by purchasing a compact disc (CD) storing that music. In this exemplary embodiment, content 2 corresponds to a user created musical work while content 1 corresponds to a musical work created by someone other than the user. in this example, the user does not have the rigid to distribute content 1 without the consent of the creator of content 1. On the other hand, the user does have the right to distribute content 2 which is created by the user.

User selected portions of content 1 are received by the content identifier 110. The content identifier 110 identifies one or more selected portions of content 1. According to one embodiment, the selected portions of content 1 may be uniquely identified using the artist name, a track number, a song name, a finger printing, etc. Finger printing refers to uniquely identifying content such that different versions of the same content or portions thereof are distinguished from one another. It is appreciated that the content identifier 110 generates one or more references to the identified portions of content 1 and outputs the references to the content recorder 130.

User selected portions of content 1 and 2 are received by the content editing effect 115 component. The content editing effect 115 component may be used to mix the selected portions of content 1 and 2 in a user defined manner. It appreciated that the content editing effect 115 component may be multi-trad mixing software operable to mix the selected portions of content 1 and content 2. The content editing effect 115 component may be used to edit and customize the audio effect of the selected portions of content 1 and 2 in the generated remix content. For example, the user may customize the speed of various portions of content 1 and 2, reverse the play order, provide echo, provide re-verb, perform compress/expand, overlap contents, etc. The volume of the content can also be specified. Thus, the music remix based on content 1 and 2 and further based on prescribed audio effects is created along with volume control.

The instruction generator 120 receives the customized portions of content 1 and content 2. In other words, the music remix based on the selected portions of content 1 and 2 and further based on audio effect are received by the instruction generator 120. The instruction generator 120 generates one or more instructions associated with the music remix received from the content editing effect 115. For example, a first generated instruction may be associated with a first portion of content 2 having a first audio effect while a second generated instruction may be associated with a first portion of content 1 having a second audio effect. The generated instructions may be used by the playback device 140 to render the selected portions of content 1 and 2 based on the audio effect specified by the user.

The content recorder 130 receives the generated instructions, the references to the selected portions of content 1, and the selected portions of content 2. It is appreciated that the content recorder 130 receives the references to the identified portions of content 1 instead of receiving the actual content. The references to the identified portions of content 1 are received instead of the actual content because the user does not have the right to distribute the content of the selected portions of content 1. On the other hand, the content recorder 130 may receive the selected portions of content 2 instead of references to the selected portions of content 2 because the user does have the right to distribute the selected portions of content 2. The content recorder 130 incorporates the received input into an output digital file of a prescribed format that may be stored in the memory component 150 for later use. It is appreciated that the output file may be transmitted to the playback device 140 for rendition.

According to one embodiment, the output file comprises a plurality of playback effects and volume instructions, selected portions of content 2, and references to selected portions of content 1. Thus, the actual content associated with the selected portions of content 1 is not incorporated in the output digital file, thereby circumventing the need to obtain a license to distribute the generated music remix.

It is appreciated that the references to the selected portions of content 1 can be used to obtain the actual content of the selected portions of content 1 for rendering by the playback device 140. For example, the references may be used to locate the selected portions of content 1 from available resources, e.g., from a CD, BLU Ray disc, MP3, the Internet, etc.

It is appreciated that in one embodiment of the present invention the created output file may contain references to the selected portions of content 2 instead of the actual content associated therewith, thereby obviating the need to obtain a distribution license to content 2. It is further appreciated that using references to the selected portions of content 2 may reduce the amount of space required to store the created output file in comparison to incorporating the actual content associated with the selected portions of content 2 in the file.

Figure 2A:
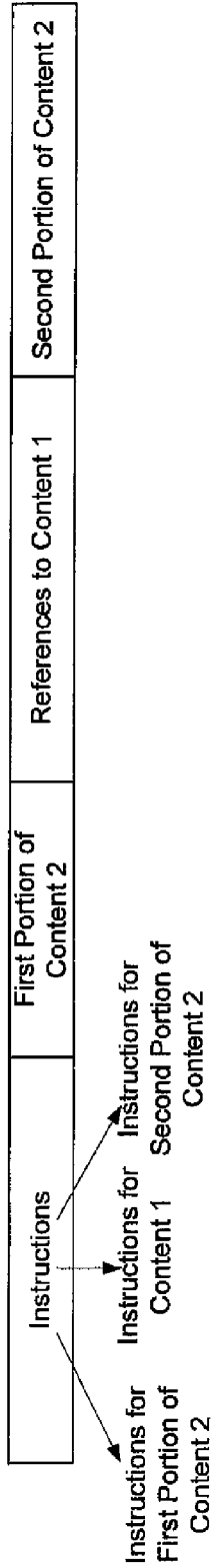
FIGS. 2A and 2B show exemplary file formats generated in accordance with embodiments of the present invention.
Figure 2B:
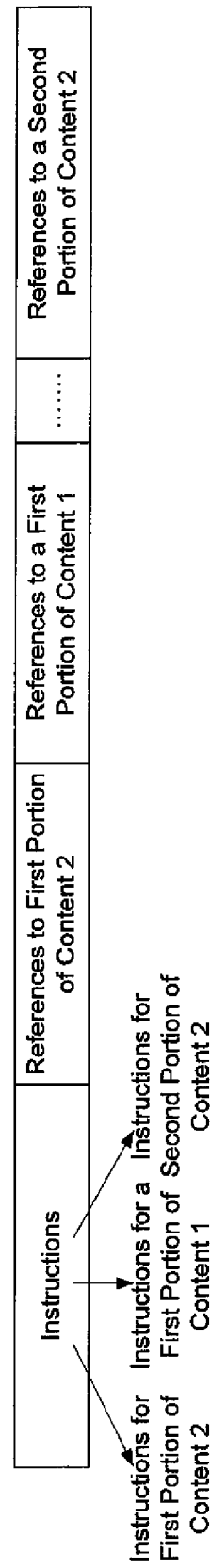

Referring now to FIGS. 2A and 2B, exemplary contents generated in accordance with embodiments of the present invention are shown. FIG. 2A shows an exemplary output file in accordance with one embodiment of the present invention. The file may comprise instructions generated by the instruction generator 120 unit. For example, the instructions may include instructions associated with the first portion of content 2, instructions associated with the selected portions of content 1, and instructions associated with the second portion of content 2. It is appreciated that the file may also include various portions of content 2 and references to various portions of content 1. The references to content 1 may be used to locate the selected portions of content 1 from available resources, e.g., a CD, BLU Ray disc, MP3, Internet, etc. It is appreciated that the instructions may be used by a playback device to render the selected portions of the content in the user specified fashion based on the audio effect.

Referring now to FIG. 2B, an exemplary digital output file in accordance with one embodiment of the present invention is shown. The digital file may comprise instructions generated by the instruction generator 120 unit similar to that of FIG. 2A. The file format includes references to content 1 and further includes references to the first and the second portions of content 2 instead of incorporating the actual content associated with content 2. Incorporating references to content 2 instead of incorporating the actual content of content 2 may be advantageous in reducing storage space.

It is appreciated that any combination of references and incorporation of actual content may be used, for the content which the user has the right to distribute. It is further appreciated that the number of portions and instructions associated with contents 1 and 2 provided herein are exemplary and not intended to limit the scope of the present invention.

Referring now to FIGS. 3A and 3B, exemplary playback of content generated in accordance with one embodiment of the present invention are shown. More particularly referring to FIG. 3A, playback of an output file, as presented by FIG. 2A, is shown. The playback device 140 may use the instructions for the first portion of content 2 in order to render the first portion of content 2. Subsequent to rendering the first portion of content 2, the playback device renders content 1 based on the instructions for content 1. The playback device 140 may use the instructions for the second portion of content 2 in order to render the second portion of content 2.

It is appreciated that content 1 is not incorporated as part of the output file. Therefore, the playback device 140 may use the references to content 1 in order to identify the portions of content 1 to be rendered. The references to content 1 may be used to locate the content, e.g., from a storage memory unit 310. It is appreciated that the storage memory unit 310 may be a server, a CD, a BLU Ray disc, etc., that stores the selected portions of content 1. Content 1 may be fetched from the storage memory unit 310 using various means, e.g., wireless communication, Internet, etc.

Accordingly, the created content comprising the selected portions of content 1 and 2 are rendered by the playback device 140 according to the user preference as specified by the audio effect. It is appreciated that the created content is rendered without obtaining consent from the creator of content 1 because references to the content is incorporated therein instead of the actual content.

Referring now to FIG. 3B, playback of an output file, as presented by FIG. 2B, is shown. The playback device 140 may use the instructions for the first portion of content 2 in order to render the first portion of content 2. The first portion of content 2 is not incorporated within the output file. Thus, references to the first portion of content 2 may be used to fetch the actual content from a storage medium 320 storing the first portion of content 2. It is appreciated that the storage memory unit 320 may be a server, a CD, a BLU Ray disc, etc., that stores the first portion of content 2. The first portion of content 2 may be fetched from the storage memory unit 320 using various means, e.g., wireless communication, Internet, etc.

Subsequent to rendering the first portion of content 2, the playback device renders content 1 based on the instructions for content 1. It is appreciated that content 1 is not incorporated as part of the output file. Therefore, the playback device 140 may use the references to content 1 in order to identify the portions of content 1 to be rendered. The references to content 1 may be used to locate the content, e.g., from the storage memory unit 310. It is appreciated that the storage memory unit 310 may be a server, a CD, a BLU Ray disc, etc., that stores content 1. Content 1 may be fetched from the storage memory unit 310 using various means, e.g., wireless communication, Internet, etc.

The playback device 140 may use the instructions for the second portion of content 2 in order to render the second portion of content 2. It is appreciated that the second portion of content 2 is not incorporated within the output file. Thus, references to the second portion of content 2 may be used to fetch the actual content from a storage medium 330 storing the second portion of content 2. It is appreciated that the storage memory unit 330 may be a server, a CD, a BLU Ray disc, etc., that stores the second portion of content 2. The second portion of content 2 may be fetched from the storage memory unit 330 using various means, e.g., wireless communication, Internet, etc.

Accordingly, the created content comprising the selected portions of content 1 and 2 are rendered by the playback device 140 according to the user preference and the specified audio effect. It is appreciated that the created content is rendered without requiring the user to obtain consent from the creator of content 1 because references to the content is incorporated therein instead of the actual content. Moreover, it is appreciated that references to various portions of content 2 is used, thereby reducing the amount space needed.

It is further appreciated that the prescribed file format may be used to control various aspects of recordings, e.g., vocals, drums, keyboard, guitar, etc., and volume thereof. As such, a user is given control over the mix of musical work as the player blends various recordings contained in the file. For example, a user may adjust the mix of the different parts of the recording instead of using the mix specified in the instructions. This flexibility enables a user to play the created file as the sound board mixer.

Moreover, it is appreciated that the used format enables a user to generate many different mixes and/or remixes of a musical work from a same source material. As such, the source material may be included in the generated content only once while many different mixes and/or remixes is generated.

In one embodiment, one or more references to content may be marked as unnecessary. Accordingly, the generated content may be rendered without the referenced content marked as unnecessary if the playback device does not have a copy of the reference material, marked as unnecessary. Moreover, it is appreciated that the unnecessary referenced content may be replaced with an alternative content if the unnecessary referenced material is not accessible by the playback device.

Figure 4:
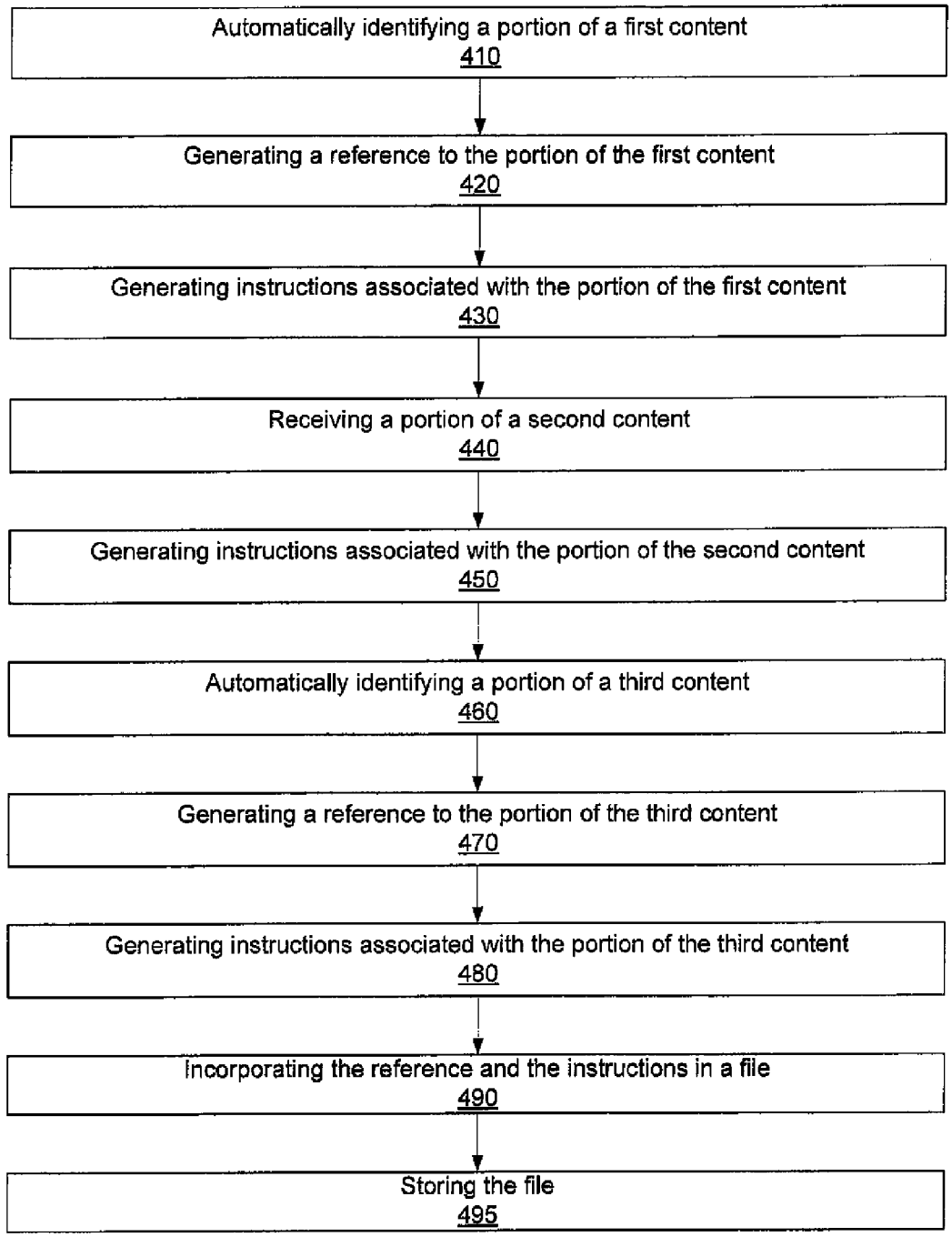
FIG. 4 shows an exemplary computer controlled flow diagram in accordance with a process of one embodiment of the present invention.

Referring now to FIG. 4, an exemplary computer controlled flow 400 diagram in accordance with one embodiment of the present invention is shown. At step 410, a portion of a first content is automatically identified. It is appreciated that the identification of the portion of the first content may be in response to a user selection of the portion of the first content.

In this exemplary embodiment the user does not have the right to distribute the selected portion of the first content. Accordingly, at step 420, references to the selected portion of the first content are generated. It is appreciated that the references uniquely identify the selected portion of the first content by using the artist name, a track number, a song name, a finger printing, etc.

At step 430, playback effects and volume instructions associated with the selected portion of the first content are generated. For example, the instructions may be used by the playback device 140 to render content based on the audio effect specified by the user, e.g., customize the speed of various portions of contents, reverse the order, provide echo, provide re-verb, perform compress/expand, overlap contents, etc. It is appreciated that the instructions can contain information about timing, both the offset into the piece of content being referred to and also the offset into the playback where the instruction indicates for it to be used.

At step 440, a portion of a second content is received. The portion of the second content may be received in response to a user selection of the portion of the second content. In this exemplary embodiment, the user has the right to distribute the portion of the second content. Accordingly, there is no need to generate references to the portion of the second content since the actual content can be used. However, in one embodiment, references to the portion of the second content may be used in order to reduce the amount of storage space.

At step 450, instructions associated with the portion of the second content are generated. The generated instructions associated with the portion of the second content may be used by the playback device 140 to render the portion of the second content based on the audio effect specified by the user, e.g., customize the speed of various portions of contents, reverse the order, echo, re-verb, compress/expand, overlap contents, etc.

At step 460, a portion of a third content is automatically identified. It is appreciated that the identification of portion of the third content may be in response to a user selection of the portion of the third content.

In this exemplary embodiment, the user does not have the right to distribute the selected portion of the third content, in this exemplary embodiment. Accordingly, at step 470, references to the selected portion of the third content are generated. It is appreciated that the references uniquely identify the selected portion of the third content by using the artist name, a track number, a song name, finger printing, etc. It is further appreciated that the portion of the third content may be a second portion of the first content or it may be from a different content entirely.

At step 480, instructions associated with the selected portion of the third content are generated. For example, the instructions may be used by the playback device 140 to render content based on the audio effect specified by the user.

At step 490, a digital file of a prescribed format comprising instructions, and references is created. It is appreciated that in one embodiment the file may include actual content of the selected portions of the content, which the user has the right to distribute. The file may be used by the playback device 140 to render content that includes the selected portions of the first, the second, and the third content based on the generated instructions. The references to portions of first content and the third content may be used to access the identified portions from a source other than the file itself. At step 495, the file may be stored.

Accordingly, the digital file may be distributed by the user. The file enables the rendition of content that does not belong to the user without incorporation of the content therein. The need to obtain consent is eliminated because no portion of the content, which the user has no right to distribute, is being incorporated in the file.

It is appreciated that the prescribed file format should be licensed for use in audio creation software and free to use in audio playback software. This is targeted to lead to much wider use of the format as the masses of amateur programmers would then be able to legally use the format for playback in their software.

Figure 5:
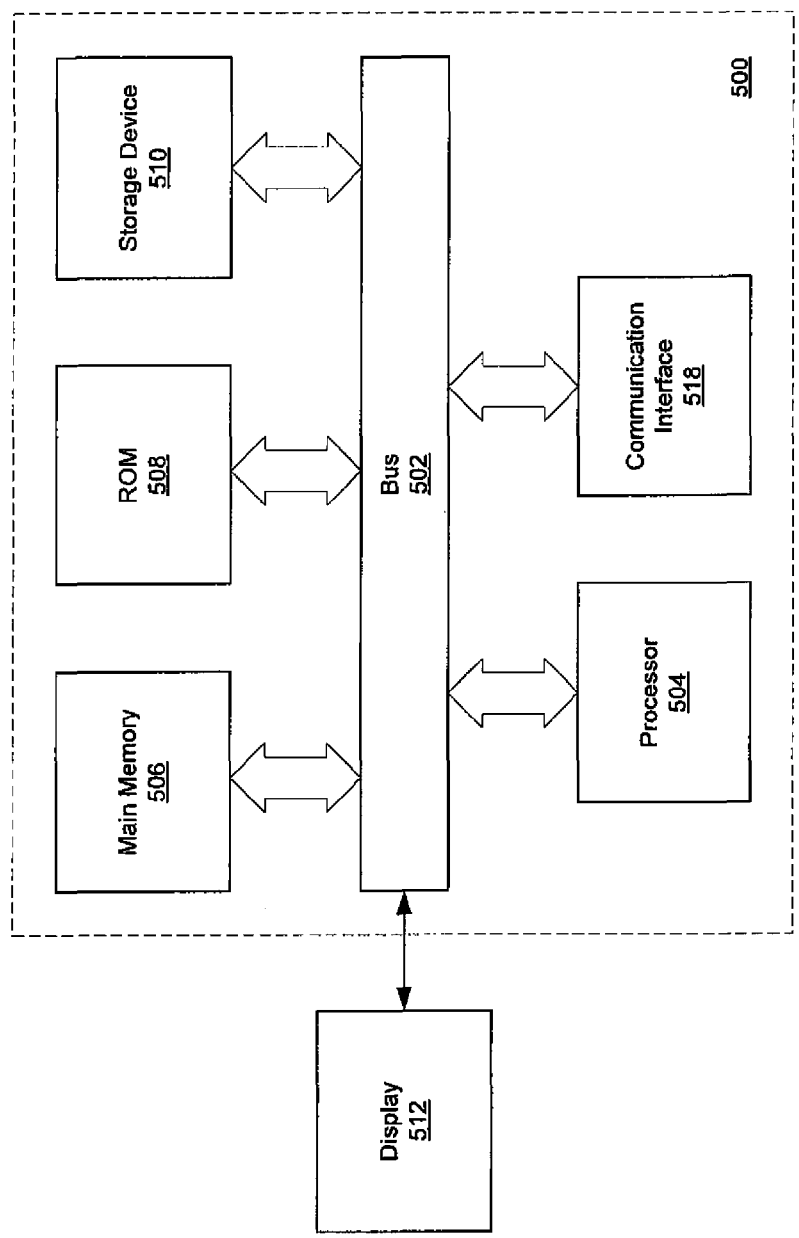
FIG. 5 illustrates a general purpose computer system that may serve as a platform for embodiments of the present invention.

FIG. 5 illustrates a general purpose computer system that may serve as a platform for embodiments of the present invention for file creation and/or file playback. Computer system 500 may implement the process for generating content as described above in conjunction with FIGS. 1 through 4. The computer system 500 may include a bus 502 or other communication mechanism for communicating information, and a processor 504 coupled with bus 502 for processing information.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A non-volatile storage device 510, such as a magnetic disk or optical disk, is provided and coupled to bus 502 for storing information and instructions and may store the persistent internal queue. According to one embodiment, the instructions for implementing the virtual device may be stored on any one of the memory components (e.g., RAM, ROM, non-volatile storage device and etc.). Computer system 500 may be coupled via bus 502 to an optional display 512, such as a cathode ray tube (CRT), for displaying information to a computer user.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 6:
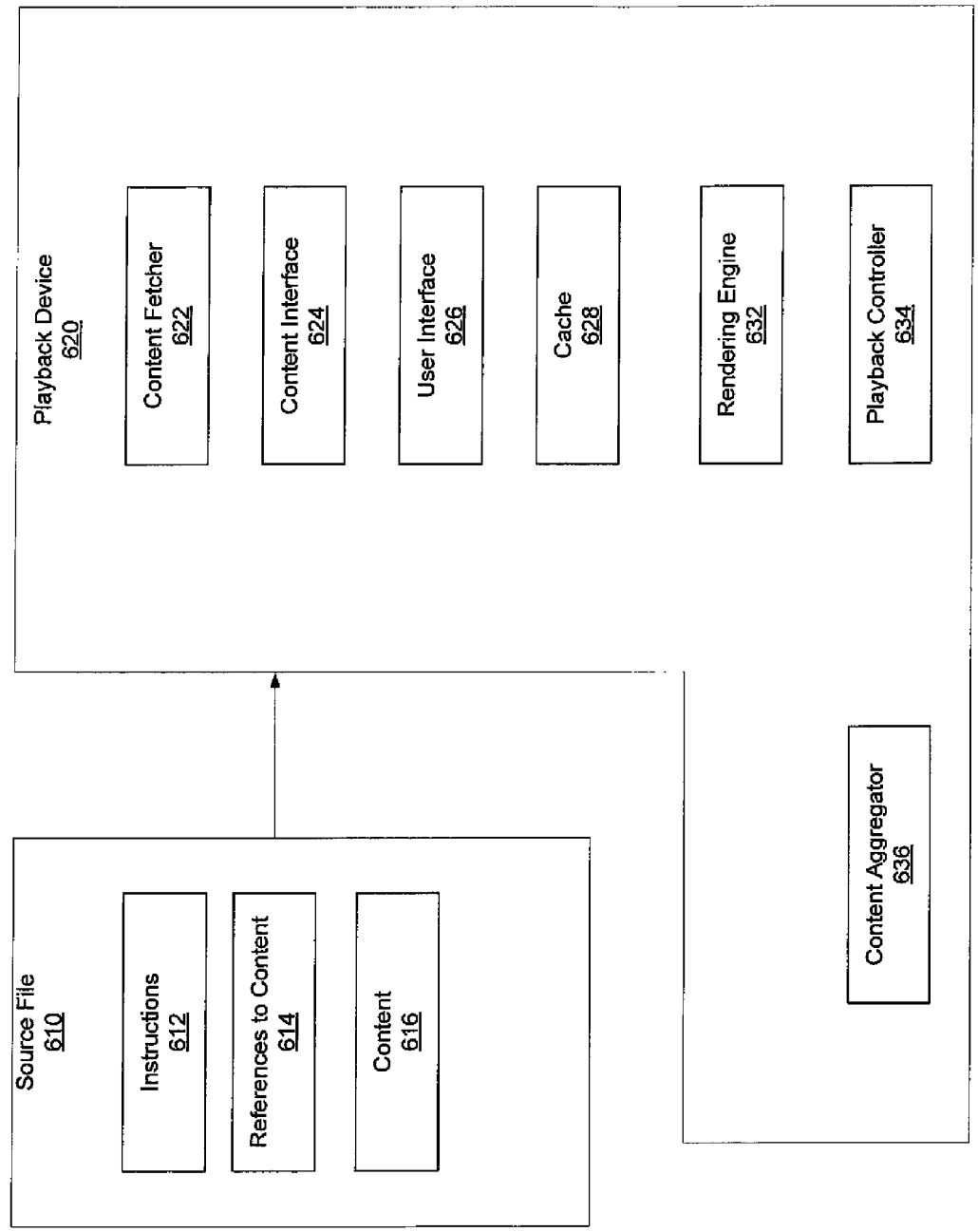
FIG. 6 illustrates an exemplary playback device rendering a generated source file in accordance with one embodiment of the present invention.

Referring now to FIG. 6, an exemplary playback device rendering a generated source file in accordance with one embodiment of the present invention is shown. A source file 610 is the content generated and is formatted such that is can be rendered on playback device 620.

The source file 610 may include instructions 612, references to content 614, and actual content 616. The instructions 612 are commands on the manner of which to combine content and to apply effects and filters, as specified by the creator of the source file 610. The instructions 612 may be generated using the instruction generator 120, as described above. The references to content 614 are generated by a content identifier 110, as presented above. The actual content 616 is data corresponding to the selected portion of a content to be incorporated within the source file, e.g., first portion of content 2 described with respect to FIG. 2A.

The playback device 620 receives the source file 610 for rendering. The playback device 620 includes a content fetcher 622, content interface 624, a user interface 626, cache 628, a rendering engine 632, a playback controller 634 and a content aggregator 636. The content fetcher 622 is operable to access and obtain the content identified by the references to content 614. It is appreciated that the content fetcher 622 may use the interface 624 to access content identified by the references to content 614. The interface 624 may include local network, Internet, optical drive, hard drive, removable media, portable music player, etc. According to one embodiment, the user interface 626 is operable to provide access to the referenced content. For example, in one embodiment, the interface 626 can be used to interface with the user when the referenced material cannot automatically be found. This interface can include listing the metadata about that referenced material, which can include things such as artist, song name, and album name. The user seeing this can insert an optical disc with the referenced material, or otherwise provide the referenced material when it was not available initially.

According to one embodiment, cache 628 stored locations of content and/or copied thereof. Thus, user interaction may not be eliminated in order to access the referenced content if the same file is being rendered more than once. The content aggregator 636 is operable to combine the referenced content and to further apply the indicated effects and filters, as specified by the instructions. The rendering engine 632 may render, e.g., audio output, video output, etc. the content as specified by the source file 610. The playback controller 634 may provide progress report of the content being rendered, e.g., time elapsed. Moreover, the playback controller 634 may provide a means to control the rendition of the source file 610, e.g., play/pause, fast forward, rewind, etc. It is appreciated that the controller 634 can be used to control the mix for embodiments of the file that have controllable mixes and it can further be used to select which mix to play for embodiments of the file that contain instructions for multiple mixes.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-useable medium that is not a transitory signal and that includes executable instructions executable by at least one processor for:
   responsive to a determination that a portion of a first work of content requires permission to distribute the portion of the first work of content and that the permission has not been obtained, generating a reference to the portion of the first work of content, the reference representing the portion of the first work of content but not being the portion of the first work of content;
   generating first instructions associated with the portion of the first work of content operable for use during rendering by a playback device; and
   incorporating the reference and the first instructions in a digital file, wherein the digital file is operable for use by the playback device to render the first work of content;
   receiving a portion of a second work of content;
   generating second instructions associated with the portion of the second work of content operable for use during rendering by the playback device; and
   incorporating the portion of the second work of content and the second instructions associated with the portion of the second work of content in the digital file.

2. The computer-useable medium as described by claim 1, wherein the executable instructions are executable for storing the digital file in a memory component.

3. The computer-useable medium as described by claim 1, wherein the executable instructions are executable for:
   automatically identifying a portion of a third work of content in response to a user selection thereof;
   in response to the identifying the portion of the third work of content, generating a reference to the portion of the third work of content;
   generating third instructions associated with the portion of the third work of content operable for use during rendering by the playback device; and
   incorporating the reference to the portion of the third work of content and the third instructions associated with the portion of the third work of content in the digital file.

4. The computer-useable medium as described by claim 1, wherein the first work of content is selected from a group consisting or audio, video, and still images.

5. The computer-useable medium as described by claim 1, wherein the playback device is operable to use the reference to access the portion of the first work of content from a source other than the digital file during rendition of the digital file.

6. The computer-useable medium as described by claim 5, wherein the playback device is operable to render the portion of the first work of content based on effects specified by the first instructions.

7. A system implemented at least partially by hardware comprising:
   a content identifier operable to identify a portion of a first work of content in response to a user selection thereof, wherein the content identifier is operable to generate a reference to the portion of the first work of content, the reference not being the first work of content;
   an instruction generator operable to generate instructions associated with playback of the portion of the first work of content operable for use during rendering by a playback device; and
   a content recorder operable to incorporate the reference and the instructions in a file, wherein the file is operable for use by the playback device during rendition of the content, wherein at least a first part of the portion of the first work of content is indicated in the file as being unnecessary such that the portion of the first work of content is rendered without rendering the at least first part responsive to identifying that the playback device cannot access a copy of the first part.

8. The system as described by claim 7, wherein the content recorder is further operable to receive a portion of a second work of content, and wherein the content recorder is further operable to incorporate the portion of the second work of content and instructions associated therewith in the file.

9. The system as described by claim 7, further comprising:
   a memory component operable to store the file.

10. The system as described by claim 7, wherein the first work of content is selected from a group consisting of audio, video, and still images.

11. The system as described by claim 7, wherein the playback device is operable to use the reference to access the portion of the first work of content from a source other than the file during rendition of the file.

12. The system as described by claim 11, wherein the playback device is operable to render the portion of the first work of content based on playback effects specified in the instructions.

13. An assembly comprising:
   at least one computer memory including executable instructions executable by at least one processor; and
   at least one processor configured to access the computer memory for:
      responsive to a determination that a portion of a first work of content requires permission to distribute the portion of the first work of content and that the permission has not been obtained, generating a reference to the portion of the first work of content, the reference representing the portion of the first work of content but not being the portion of the first work of content;
      generating first instructions associated with the portion of the first work of content operable for use during rendering by a playback device;
      incorporating the reference and the first instructions in a file, wherein the file is operable for use by the playback device to render the first work of content;
      receiving a portion of a second work of content;
      generating second instructions associated with the portion of the second work of content operable for use during rendering by the playback device; and
      incorporating the portion of the second work of content and the second instructions associated with the portion of the second work of content in the file.

14. The assembly of claim 13, wherein the executable instructions are executable for:
   storing the file in a memory component.

15. The assembly of claim 13, wherein the executable instructions are executable for:
   automatically identifying a portion of a third work of content in response to a user selection thereof;
   in response to the identifying the portion of the third work of content, generating a reference to the portion of the third work of content;
   generating third instructions associated with the portion of the third work of content operable for use during rendering by the playback device and incorporating the reference to the portion of the third work of content and the third instructions associated with the portion of the third work of content in the file.

16. The assembly of claim 13, wherein the first work of content is selected from a group consisting of audio, video, and still images.

17. The assembly of claim 13, wherein the playback device is operable to use the reference to access the portion of the first work of content from a source other than the file during rendition of the file.

18. The assembly of claim 17, wherein the playback device is operable to render the portion of the first work of content based on effects specified by the executable instructions.

19. The system of claim 7, wherein at least a second part of the portion of the first work of content is indicated in the file as being necessary such that the portion of the first work of content is not rendered responsive to a determination that the playback device cannot access a copy of the second part.

* * * * *